Nov. 15, 1938.  W. LOWE  2,136,388
METHOD AND MACHINE FOR MAKING HOLLOW CONDUCTORS
Filed May 3, 1937  4 Sheets-Sheet 1
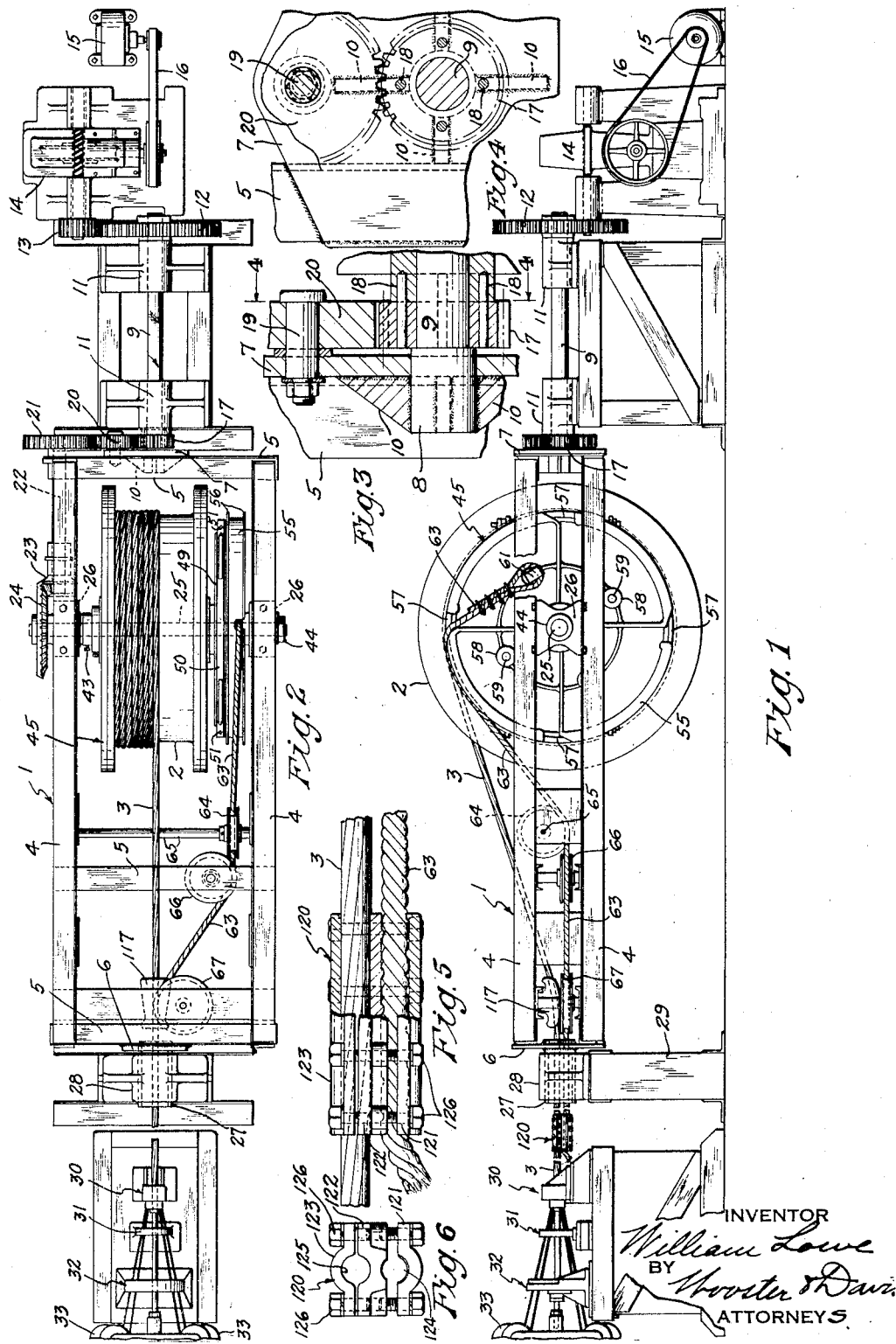
INVENTOR
William Lowe
BY Wooster & Davis
ATTORNEYS

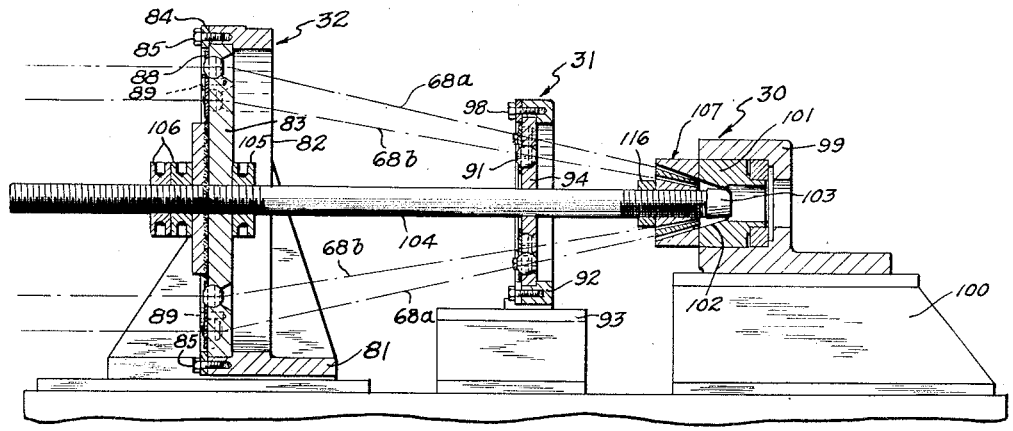
Fig. 7
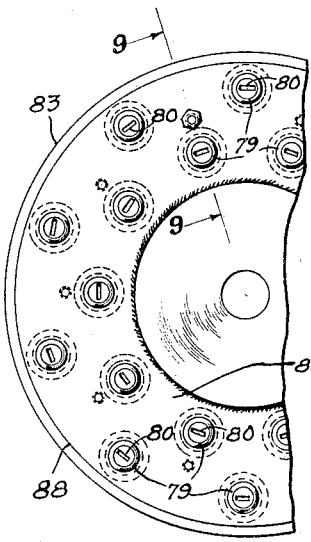
Fig. 8
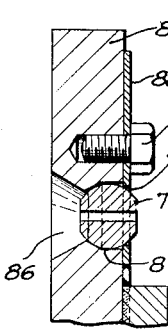
Fig. 9
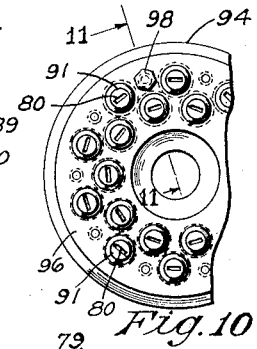
Fig. 10
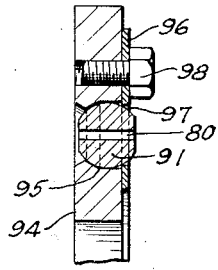
Fig. 11
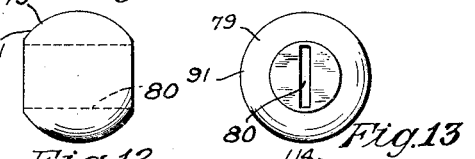
Fig. 12   Fig. 13
Fig. 16   Fig. 18
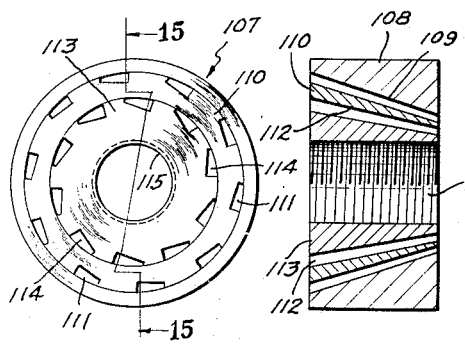
Fig. 14   Fig. 15
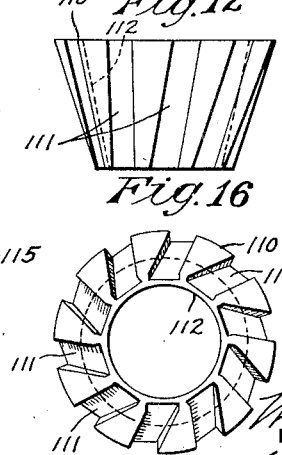
Fig. 17   Fig. 19

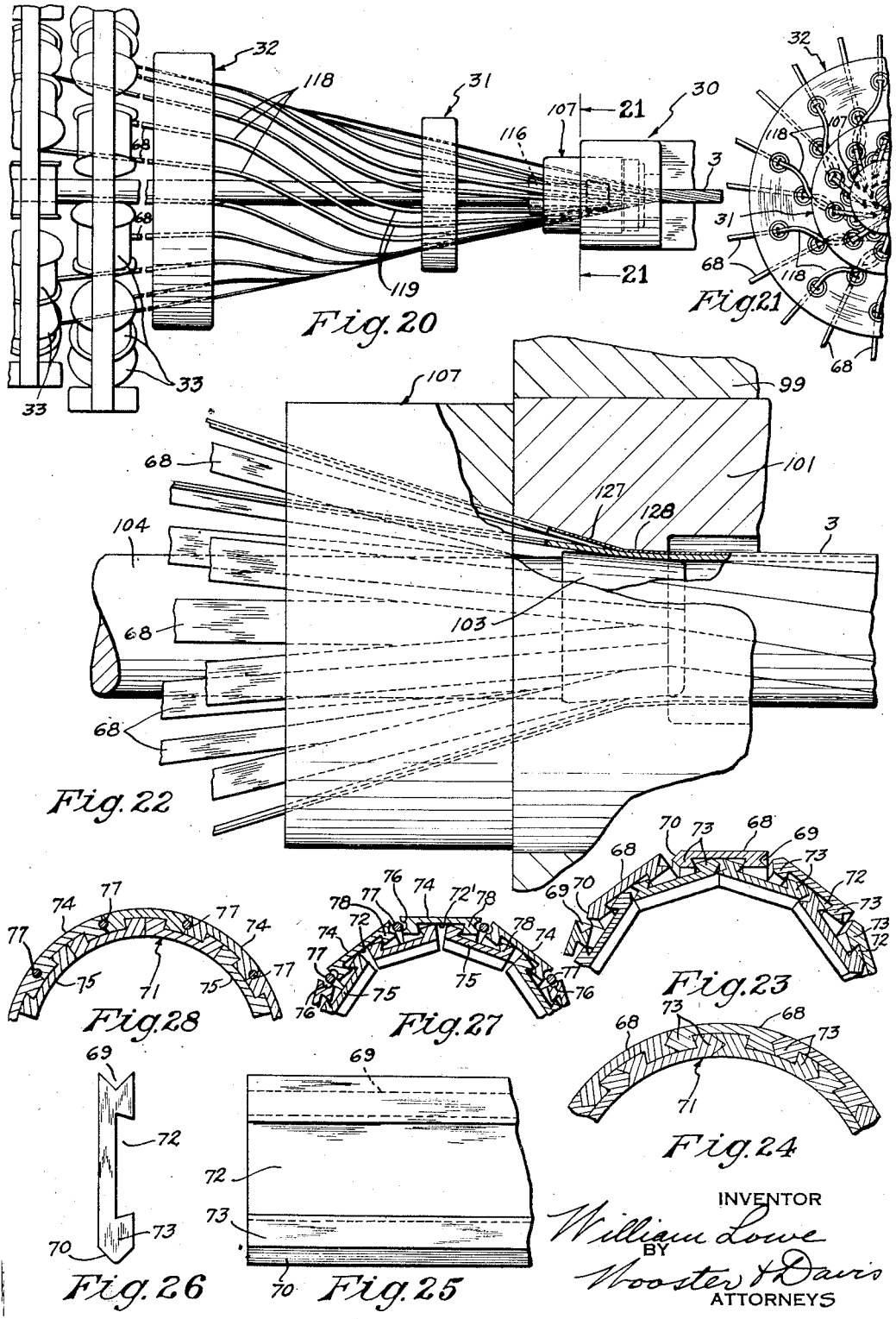

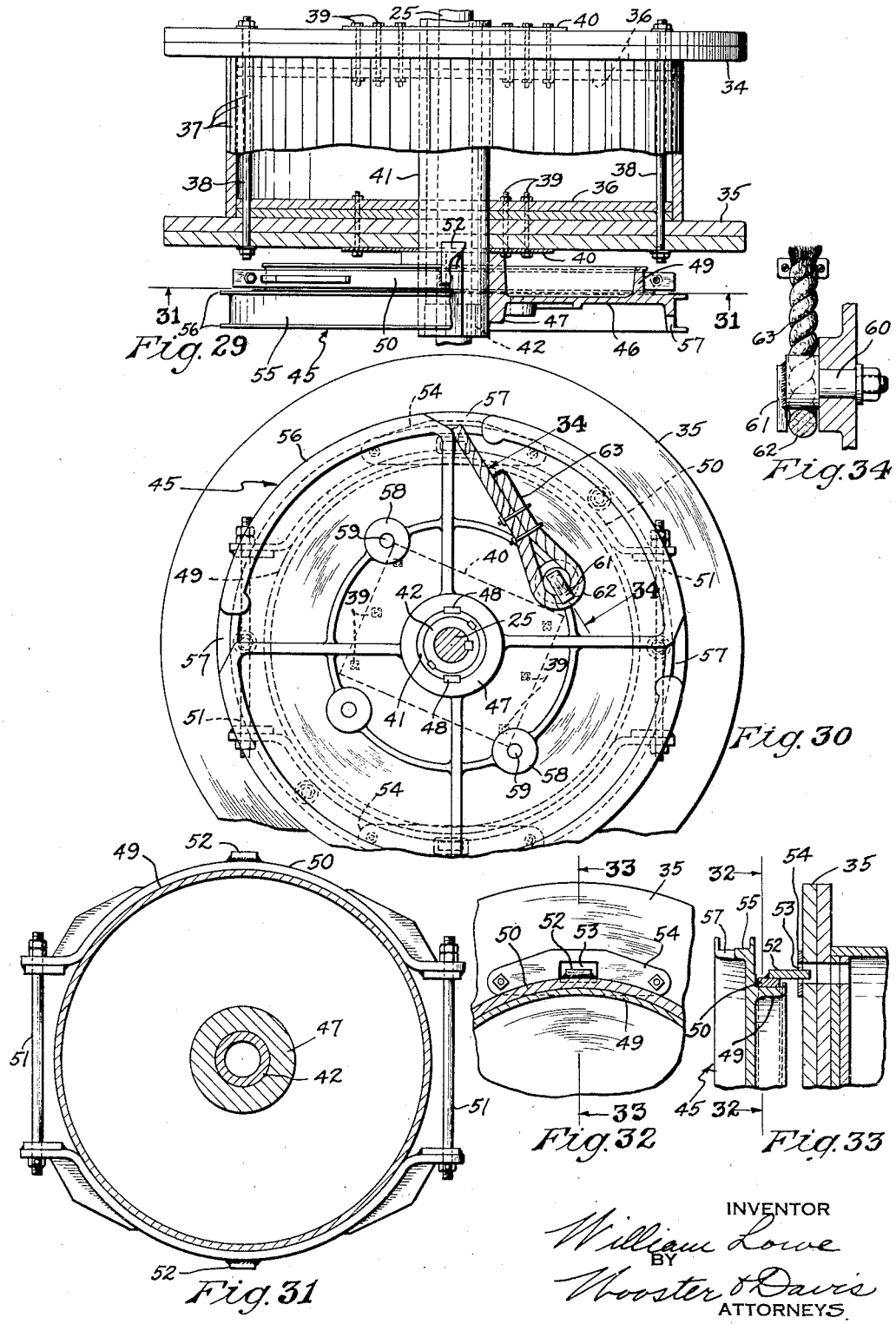

Patented Nov. 15, 1938

2,136,388

UNITED STATES PATENT OFFICE 2,136,388

METHOD AND MACHINE FOR MAKING HOLLOW CONDUCTORS

William Lowe, Ansonia, Conn., assignor to Anaconda Wire and Cable Company, New York, N. Y., a corporation of Delaware Application May 3, 1937, Serial No. 140,474

24 Claims. (Cl. 117—49)

This invention relates to a machine and method for making hollow, flexible conductors, and has for an object to provide an improved machine and method for making hollow conductors composed of a plurality of separate strands or wires of the type disclosed in my prior applications Serial Numbers 119,435 and 119,436, filed January 7, 1937. These conductors are composed of a plurality of separate wires or strands, generally of substantially rectangular shape in cross section, arranged in two superimposed layers in the conductor, there being means at the edges of adjacent strands to hold them against separation in a direction radially of the conductor, and also cooperating means on the strands of the two layers to prevent them from separating.

With the foregoing and other objects in view, which will become more apparent from the following specification taken in connection with the accompanying drawings, I have devised the construction shown.

In these drawings:

Fig. 1 is a side elevation of the machine embodying my invention;

Fig. 2 is a top plan view thereof;

Fig. 3 is a detailed section of a portion of the operating mechanism;

Fig. 4 is a section substantially on line 4—4 of Fig. 3;

Fig. 5 is a partial side elevation and partial section of a clamp employed;

Fig. 6 is an end view thereof;

Fig. 7 is a longitudinal vertical section through the die and the guide means for the strand;

Fig. 8 is a front elevation of a portion of the larger guide plate looking from the left of Fig. 7;

Fig. 9 is a detailed section on an enlarged scale substantially on line 9—9 of Fig. 8;

Fig. 10 is an elevation of a portion of the smaller guide plate looking from the left of Fig. 7;

Fig. 11 is a detailed section on an enlarged scale substantially on line 11—11 of Fig. 10;

Fig. 12 is a side elevation of one of the guide members;

Fig. 13 is an end view thereof;

Fig. 14 is an end view of the guide for the strands leading into the assembling die;

Fig. 15 is a transverse section thereof substantially on line 15—15 of Fig. 14;

Fig. 16 is a plan view of the intermediate guide member of Figs. 14 and 15;

Fig. 17 is an end view thereof looking toward the bottom of Fig. 16;

Fig. 18 is a plan view of the inner guide member of Figs. 14 and 15;

Fig. 19 is an end view thereof looking toward the bottom of Fig. 18;

Fig. 20 is a top plan view of the die and associated guide members for the strand;

Fig. 21 is a section substantially on line 21—21 of Fig. 20;

Fig. 22 is a partial side elevation and partial section of the assembling die;

Fig. 23 is a transverse section showing a number of strands as they are brought together in making a conductor;

Fig. 24 is a transverse section of a portion of a conductor which may be made on the machine;

Fig. 25 is a side elevation of one of the strands of Fig. 23;

Fig. 26 is an end view thereof;

Fig. 27 is a view similar to Fig. 23 showing how the strands are brought together for a modified conductor construction;

Fig. 28 is a transverse section of a portion of the conductor formed with the strands of Fig. 27;

Fig. 29 is a partial plan view and partial section of a windup reel or drum used for reeling the conductor;

Fig. 30 is an end view thereof looking toward the bottom of Fig. 29;

Fig. 31 is a section substantially on line 31—31 of Fig. 29;

Fig. 32 is a detailed section substantially on line 32—32 of Fig. 33;

Fig. 33 is a section substantially on line 33—33 of Fig. 32; and

Fig. 34 is a detailed section of means for connecting the draw rope to the operating drum.

The device comprises a cradle 1 mounted to rotate about a horizontal axis and carrying the windup reel or drum for the finished conductor or cable 3. This cradle comprising longitudinally extending angle members 4 secured at their ends to transversely extending angle members 5 mounted on end plates or heads 6 and 7. These elements may be secured together by any suitable means, but are preferably welded. The plate 7 at one end is mounted on the enlarged end 8 of a shaft 9, it being secured by means of triangular ribs or plates 10 welded to the plate 7 and to the shaft. The shaft runs in suitable bearings 11, and is driven from any suitable source of power, such a spur gear 12 meshing with a pinion 13 driven by a reducing worm and worm gear drive 14 driven from a motor 15 through a chain drive 16. Secured against rotation relative to the bearing 11 nearest the cradle is a stationary gear 17, it being held against rotation by any suitable means, such for example as pins 18 extending through the gear into the bearing. Mounted on a bearing stud 19 carried by the head or plate 7 is an idler gear 20 meshing with the gear 17, and a third gear 21 carried by the cradle meshes with the idler gear 20. This third gear 21 is mounted on a shaft 22 running in bearings on the cradle so that this shaft 22 together with the gears 21 and 20 rotate with the cradle and its head 7. The shaft 22 carries a beveled pinion 23 meshing with a beveled gear 24 on a transverse shaft 25 running in suitable bearings 26 mounted between the angle members 4 of the cradle. This shaft carries a windup reel 2 and associated driving elements which will presently be described. The opposite end of the cradle comprising the head or plate 6 carries a tubular bearing member or short shaft 27 running in a bearing 28 mounted on a suitable stand 29. Beyond this bearing is the die 30 for assembling the strands to form the conductor, and beyond this die are the guides 31 and 32 for the individual strands as they are taken from the reels 33 and led to the die. All of this will be later described.

The windup reel 2 shown more clearly in Fig. 29 is preferably of wood and is composed of two flanges 34 and 35, to the inner sides of which are bolted circular wooden members 36 supporting on their peripheries the wooden boards or slats 37 extending between the flanges 34 and 35 and forming the body of the reel on which the conductor is wound, the flanges being clamped against these bars or slats by suitable bolts 38. The bolts 39 clamping the circular members 36 to the inner sides of the flanges also clamp to the outer sides of these flanges metal plates 40 through which a sleeve 41 in the form of a strong pipe passes. In the opposite ends of this sleeve or pipe are secured centering members or collars 42 which are keyed to the sleeve 41 and also to the transverse shaft 25. The reel 2 is free to turn on the sleeve 41, this sleeve extending between the bearings 26 for the transverse shaft 25, and this shaft extends through this sleeve and the centering members 42. A set screw 43 in the sleeve clamps against the shaft and holds it against relatively longitudinal movement, and a collar 44 secured to the free end of the shaft by any suitable means such as set screws holds it against withdrawal during operation. By removing the collar 44 and loosening the set screw 43 the shaft 25 may be drawn laterally, or upwardly as viewed in Fig. 2, permitting the reel to be removed from the cradle. After it is removed from the cradle the filled reel may be slid off the sleeve 41 and an empty reel applied and then placed back in the cradle for winding a conductor thereon.

Mounted on the sleeve 41 at one side of the reel is a stepped drum 45 which is keyed to the sleeve 41 to rotate therewith, this drum including a web 46 connecting the peripheral portions of the drum with a central hub 47 which is keyed to this sleeve 41 as indicated at 48. Mounted on the inner or smaller stepped portion 49 of the drum are a pair of friction straps or clamps 50 connected by clamping bolts 51, and these straps each carry a lug 52 secured thereto by any suitable means such as welding and projecting laterally therefrom toward the reel. The free ends of these lugs extend into openings 53 in metal plates 54 secured to the outer face of the flange 35 of the reel so that there is thus a driving connection between the reel and the straps 50. When the bolts 51 are loosened these straps are free to turn on the drum portion 49 so that the reel may turn relative to the drum and the sleeve 41, or the drum relative to the reel, but when these bolts 51 are tightened they clamp the straps to the drum portion 49 so that these straps rotate with the drum and provide a friction driving connection between the drum 45 and the reel.

The drum 45 also has an outer drum portion 55 between flanges 56, and spaced about its periphery are any suitable number of openings or notches 57 leading to the interior of the drum and also outwardly through the outer flange 56. The web 46 carries a boss 58 inwardly of each opening 57 having an opening 59 to receive the stud 60 of a hook 61 for securing a looped end 62 of a drawing or transmission rope 63, this rope passing through a corresponding opening 57 to the periphery of the drum portion 55. It will be seen from this that this rope may be passed through any one of the notches or openings 57 and secured to the hook member 61 which may be mounted in the corresponding boss 58. This rope is used for starting the conductor through the die and drawing and forming enough of this conductor to start one or two turns around the reel in starting to fill a new reel, as will later be described.

As will be seen from Figs. 1 and 2 this rope passes over a guide pulley 64 on a transverse shaft 65 in the cradle, over another guide pulley 66 to a third guide pulley 67 located with its periphery in alignment with the hollow bearing shaft 27.

The die for assembling the strands for forming the conductor and the associated guides are shown in Figs. 7 to 22, and examples of the conductor which may be formed on this machine are shown in Figs. 23 to 28. The examples shown in these figures are the conductors described in my prior applications above noted. It will of course be understood that other specific constructions of conductors comprising a plurality of interengaging strands may be made on this machine by modifying the die and guides for the strands accordingly.

The arrangement shown comprises the die 30 located adjacent one end of the cradle 1 and two spaced sets of guides 31 and 32 for the individual strands of the conductor which are fed to the sets of guides 32 from stationary reels 33, it being understood the individual strands or wires are previously formed by any suitable means or method, such for example as rolling or drawing, and wound on these reels. The form of conductor shown in Figs. 23 to 26 is made up of a plurality of individual strands 68 which are generally of rectangular shape in cross section. There is a longitudinal groove 69 in one longitudinal side edge with the opposite edge 70 shaped to generally correspond with the shape of this groove and to seat in the corresponding groove of the next adjacent strand as indicated in Fig. 24. The conductor is composed of two layers of these strands, the inner layer 71 providing an arch support for the outer layer. Along one side of each strand is a groove 72 and the opposite side edges of this groove are inclined so as to overhang, and thus the groove is wider at its base or inner surface than at its outer edge or opening. When placed in the cable the strands of the inner layer are reversed from the strands of the outer layer so that the longitudinal ribs 73 of two adjacent strands formed on one side of the strand between the groove 72 and the edges of the strand are received in the groove 72 of the overlapped strand of the other layer. Thus as will be seen from Fig. 24 the adjacent strands are held against separation radially of the conductor by the coaction of the grooves 69 and similarly shaped edges 70, and the strands of two layers are held against separation radially and also circumferentially by the ribs 73 seating and held within the groove 72, as will be evident from Fig. 24.

The conductor shown in Figs. 27 and 28 is of somewhat different construction although it is composed of two layers of strands 74 and 75. These strands are also of general rectangular shape in cross section and have the same longitudinal groove 72' at one side the same as the form of Figs. 23 to 26, but instead of having one longitudinal edge shaped to fit into a groove in the longitudinal edge of an adjacent strand each longitudinal edge of the strands 74 of the outer layer is provided with a longitudinal groove 76 which groove is in alignment with the corresponding groove of the next adjacent strand when in the conductor, and in which is a separate strand or wire 77, this wire preferably being circular in cross section. As will be seen, when the strands or wires are in the conductor the wires 77 hold the strands of the outer layer against separation radially, while the ribs 78 formed between the groove 72' and the edges of the strand seat in the groove 72' of the other layer, the same as the ribs 73 in the form of Figs. 23 and 24, and hold the layers of strands from separating radially and also hold the strands from separating circumferentially of the conductor. The inner layer of strands 75 form an arch support for the outer layer the same as in the other form.

The strands or wires 68, 74 or 75 pass from the reel 33 through individual guides 79 comprising the set of guides 32. These guides 79 are substantially ball-shaped members and have a guide passage 80 therethrough corresponding to the general cross-sectional shape of the strands or wires going into the conductor. This guide 79 is mounted so that it may turn to adjust itself to the line of the wire or strand passing therethrough. The present mounting comprises a stand or bracket 81, preferably adjustably mounted on any suitable support so that it can be moved toward and from the die 30 for proper location, and includes a frame portion 82 having an open center and a groove at one side in which is seated a block 83, and in which it may be secured by any suitable means such as a ring 84 overlapping the edge of this block and secured to the frame by screws 85. By removing these screws the whole block may be removed from the frame and another block substituted. This block 83 is provided with a series of openings 86 therethrough which are flared outwardly or enlarged on their exit sides, but on the opposite side is shaped as indicated at 87 to form a socket to receive the guide 79 and permit it to adjust itself therein. These guides are held in the socket by a plate 88 secured to the block 83 by suitable screws 89 and having openings 90 therein over the guides 79, the diameter of these openings being less than the largest diameter of the guide so as to retain these guides in the socket.

Between the set of guides 32 and the die 30 is another set of guides 31. These individual guides 91 are similar to the guides 79 in the set 32 and are mounted in the same manner in a frame 92 adjustable on a suitable support 93 toward and from the die 30. The guide members 91 of this set are mounted in a block 94 secured in the frame 92 in the same manner as the block 83 in the frame 82, the only difference being that this block is smaller so that the guides 91 are nearer the axis because of the inclination of the strands indicated by the lines 68a and 68b, the line 68a indicating the strands forming the outer layer of strands of the conductor and 68b indicating the strands forming the inner layer of strands of the conductor.

The block 94 has similar sockets 95 to receive the guides 91 which are held therein by the plate 96 having openings 97 over the guides 91 to hold them in their sockets, the same as described in connection with the guides 79, the retaining plate 96 being secured to the block 94 by screws 98.

The die 30 comprises a recessed holder 99 mounted on any suitable support 100, and mounted in the recess is a die member 101 having a tapered wall 102. Located within this tapered wall and concentric therewith is a plug 103 which also has tapered outer walls which cooperate with the tapered walls of the die member, as will be later described. This plug is mounted on a bar 104 which extends through the block 83 and is adjustable relative thereto by collars 105 and 106 threaded on the bar, the collars 106 coacting with the block 83 hold the plug 103 in the proper position in the die. At the inlet side of the die member 101 are die guides indicated as a whole by numeral 107. These comprise an outer member 108 having a tapered opening 109 therethrough, and within this opening is a tapered guide member 110 having in its outer surface guide grooves 111 for the outer strands 68a, and as will be seen in Figs. 16 and 17 these guide grooves are set at an angle to the axis of the die. This guide member has a tapered opening 112 therein in which is seated an inner tapered guide 113. In the outer wall of this inner member are guide grooves 114 for the inner strands 68b, these grooves being also inclined to the axis of the die as indicated in Figs. 18 and 19. This inner member is threaded at 115 on to the bar 104 so that it is adjustable thereon and may be held in adjusted position by a lock nut 116.

As will be seen from Figs. 7 and 20 to 22 the strands or wires 68 pass from the reels 33 through the guides 79 and 91 and the die guide 107 to the die proper 101, through the end bearing 27 of the cradle and over a guide 117 (Figs. 1 and 2) to the reel 2 on which the finished conductor is wound. As will be seen from Figs. 20 and 21 the guides in the sets of guides 31 and 32 are offset laterally relatively to each other, so that as the individual wires or strands pass from the sets of guides 32 they are bent laterally in one direction as indicated at 118, and then just before entering the sets of guides 31 they are bent laterally in another direction as indicated at 119, so that before they enter the die they have been given a general spiral shape similar to the shape they have in the finished conductor, it being understood as shown by Figs. 1, 2 and 20 that the individual strands are of a spiral shape in the conductor, and it is also to be understood that they are capable of sliding movement relative to each other so that the finished conductor is flexible.

The strands are drawn through the die and the guides 31 and 32 by the reel 2 on which the finished conductor is wound, and it will be seen that as the cradle 1 carrying this reel is rotated about a horizontal axis passing through the bearings 11 and 27 the conductor is given a twisted form as indicated, the individual strands lying in a spiral, and as the cradle rotates the reel 2 is rotated to draw the strands through the guide and the die. As the head 7 of the cradle is rigid on the shaft 9 it will be evident that as the shaft 9 is rotated this cradle will be rotated with it, and as the gears 20 and 21 are mounted on the head 7 they will be carried with it in a planetary path around the stationary gear 17. This movement rotates the gear 20 which meshes with the gear 17 which in turn drives the gear 21 on the shaft 22. This drives the beveled pinion 23 and the beveled gear 24 to drive the shaft 25 on which the sleeve 41 is mounted and to which it is connected by feather keys and set screws as previously described. Therefore the shaft 25 drives the stepped drum 45 and, through the previously described mechanism, drives the reel 2.

It will be evident that before the reel 2, however, functions to draw the conductor through the die a sufficient length of conductor must be formed to wrap one or two turns around the reel. This is accomplished by the rope 68. Sufficient of the strands are inserted through the die 30 so that a short length of the conductor 8 projects from the die, and the rope 68 is connected to this short length of conductor by a suitable clamp 120 shown in Figs. 5 and 6. This clamp comprises three plate members 121, 122 and 123 with the members 121 and 122 having aligned grooves 124 to receive the rope, while the members 122 and 123 have aligned grooves 125 to receive the conductor. By tightening up the transverse bolts 126 the clamp is securely clamped on the rope and the conductor and the loop 68 in the opposite end of the rope is passed over the hook 61 carried by the drum 45, the rope passing from this hook through one of the notches 57 in this drum over the surface 58 of the drum, guide pulleys 65, 66 and 67, and through the hollow bearing 27. The cradle now can be rotated and with it the drum 45 to pull some of the conductor through the die, and if the arrangement of the parts are such that not enough can be pulled through by one operation a certain length can be drawn through the die and then the clamp 120 loosened and shifted toward the die to secure a new grip on the conductor and another length pulled through, until enough has been drawn through the die to give one or two turns around the reel 2. After that the rope 68 may be disconnected from the drum and the reel 2 used to draw the conductor through the die until the reel is filled, at which time it may be removed and a new empty reel installed.

As previously described the individual strands 68 are given preliminary bends by the guides 79 and 91 so that they are substantially their spiral shape before they pass into the die mechanism 30. They pass from the guide 91 through the guide grooves 111 and 114 in the guide die 107 which is just in front of the die member 101. These guide grooves 111 and 114 serve to guide the individual wires or strands into their proper relation to each other as indicated in Figs. 23 and 27, so that as they pass into the die proper 101 the coacting grooves and ribs come naturally together and they are therefore in nested relation as they pass into this die 101. This die 101 and the tapered plug 103 give the strands a final forming operation to bend them laterally to the proper curvature to agree with the curvature of the conductor as indicated in Figs. 24 and 28.

There is a guide in each of the sets 31 and 32 for each of the individual strands, and the same will be true in the form of conductor shown in Figs. 27 and 28, there being guides in these guide sets for the wires 77. The tapered wall 102 of the die 101 and the tapered wall of the plug 103 are so proportioned, as shown in Fig. 22, that the strands will come together in the tapered space between these surfaces indicated at 127 in Fig. 22, and as they are brought together the coacting ribs and grooves 69, 70, 72 and 73, and grooves 72' and ribs 78 (and the wires 77 in grooves 76) and so on come together in nested relation, and then as they pass through the narrow space 128 between the die member and the plug they are given their final shape or laterally curved form, as shown in Figs. 24 and 28, to provide a smooth round surface both on the inside and the outside of the conductor. As previously pointed out these strands are all laid in a spiral condition in the conductor by the rotation of the cradle 1 about its horizontal axis and the rotation with it of the axis of the reel 2 in a plane at right angles to the axis of rotation of the cradle, which is also the longitudinal axis of the conductor as it leaves the die.

Also as previously pointed out the forms of the conductors shown in Figs. 23 to 28 are shown by way of example, and of course the same mechanism may be employed to form conductors of different specific constructions.

Having thus set forth the nature of my said invention, what I claim is:

1. A method of making a hollow flexible conductor comprising running a plurality of segmental wire strands through a die in two tubular layers to bring together means at the contiguous edges of adjacent strands to secure them against separation radially, and also to bring together means on the strands of the two layers to hold the layers against radial separation, guiding the inner layer to a circular shape to form a supporting arch for the outer layer, and guiding the outer layer into intimate contact with the inner layer.

2. A method of making a hollow flexible conductor comprising running a plurality of segmental wire strands through a die in a plurality of superimposed layers, guiding the strands to bring together means at the contiguous edges of adjacent strands to secure them against separation radially and to bring together means on the strands of the layers to hold the layers against radial separation, and simultaneously twisting the two layers in the same direction to lay the strands in a spiral in the conductor.

3. A method of making a hollow flexible conductor comprising running a plurality of substantially flat longitudinally grooved wire strands through a die in superimposed layers to bring the grooves in nesting relation with means to hold the adjacent strands and the adjacent layers against separation radially, simultaneously twisting the two layers in the same direction so that the strands lie in spirals in the conductor, and bending the strands in opposite directions before they enter the die to give them the general spiral shape they will have in the conductor.

4. A method of making a hollow flexible conductor comprising providing a plurality of wire strands having means at their edges adapted to hold the strands when side by side in a conductor from separating radially of the conductor, bending these strands to substantially spiral shape, and running them through a die in superimposed layers to bring said holding means together.

5. A machine for making a hollow flexible conductor comprising a die, including a block having a tapered opening, a central plug in said opening, a guide member at the front of said opening having inclined guide grooves for a plurality of segmental strands arranged to guide said strands to the opening about the plug to lay the strands in a conductor, means on the entrance side of said die to guide the strands to said grooves, a cradle on the other side of the die rotatable about an axis longitudinal of the die, a reel on the cradle for winding up the conductor from the die and draw the strands therethrough, said reel being mounted to rotate on an axis extending transversely of the axis of the cradle, and means for rotating the cradle and the reel.

6. A machine for making a hollow flexible conductor comprising a die having concentric tapered members provided with guide grooves for a plurality of segmental strands arranged to locate the strands in superimposed layers in a conductor, means for guiding the strands to the grooves, and means for drawing the conductor from the die.

7. A machine for making a hollow flexible conductor comprising a die having concentric tapered members provided with guide grooves for a plurality of segmental strands, said grooves being inclined laterally in a direction circumferentially of the die and arranged to locate the strands in superimposed layers in a conductor, means supplying strands to the grooves, and means for drawing the conductor from the die.

8. A machine for making a hollow flexible conductor comprising a die member having a circular opening, a circular plug within the opening, concentric tapered members at the entrance to said opening having a plurality of guide grooves for segmental wire strands arranged to guide them into the opening in superimposed layers to form a conductor, and means for drawing the conductor from the die.

9. A machine for making a hollow flexible conductor comprising a die member having a circular opening, a circular plug within the opening, concentric tapered members at the entrance to said opening having a plurality of guide grooves for segmental wire strands, said grooves being inclined in a direction circumferentially of the die and arranged to guide the strands into the opening in superimposed layers to form a conductor, and means for drawing the conductor from the die and at the same time turning it about its axis.

10. A machine for making a hollow flexible conductor comprising a die member having a circular opening, a circular plug within the opening, concentric tapered members at the entrance to said opening having a plurality of guide grooves for segmental wire strands arranged to guide them into the opening in superimposed layers to form a conductor, means to bend the individual strand into a spiral of substantially the shape it has in the conductor before it enters its guide groove, and means for drawing the conductor from the die.

11. A machine for making a hollow flexible conductor comprising a die for arranging a plurality of segmental wire strands in superimposed layers in a conductor, a plurality of sets of guides forwardly of the die and spaced longitudinally from each other, each set including a substantially ball shaped member having a guide opening for a strand and mounted for substantially universal rocking movement, and means for drawing the conductor from the die.

12. A machine for making a hollow flexible conductor comprising a die including a block having an opening of substantially the external diameter of the conductor and a tapered entrance to said opening, a plug in the center of the opening and having a tapered outer wall at a less inclination than the taper of the entrance opening to provide a space between the walls of the entrance opening and the plug which flares outwardly, concentric guide members at the front of said entrance opening and having guide grooves for a plurality of segmental strands, said grooves being arranged to guide the strands into said flared space in superimposed layers and side by side in the layers, and means for drawing the strands through the die.

13. A machine for making a hollow conductor comprising a die having a tapered opening, a plug in the center of the opening of less taper than the opening, concentric guides at the entrance to said opening having a plurality of laterally inclined guide grooves for a plurality of segmental strands, said grooves being arranged to guide the strands into the space between the die and the plug in superimposed layers and side by side in the layers, and means for drawing the strands through the die.

14. A machine for making a hollow flexible conductor comprising a die, means for guiding a plurality of strands to the die to form the conductor, a rotatable reel for drawing the conductor from the die, a drum, a releasable driving connection between the drum and the reel, a draw rope, said drum having an opening in its periphery for the draw rope, means for detachably connecting the rope to the drum, a clamping means for securing the rope to the conductor to draw sufficient from the die to start it on the reel, and means for driving the drum.

15. A machine for making a hollow flexible conductor comprising a die, means for guiding a plurality of strands to the die to form the conductor, a cradle associated with the die and mounted to rotate about an axis longitudinal of the die, a reel on the cradle rotatable about an axis extending transversely of the cradle axis, a drum, a releasable driving connection between the drum and the reel, a draw rope, means for detachably connecting the draw rope to said drum, means for detachably securing the draw rope to the conductor to draw sufficient from the die to start it on the reel, and means for rotating the cradle and the drum.

16. A machine for making a hollow flexible conductor comprising a die having a tapered member provided with a plurality of laterally inclined guide grooves for a plurality of segmental strands and arranged to locate the strands in a layer in a conductor and with the strands edge to edge, and means for drawing the conductor from the die and at the same time turning it about its axis.

17. A machine for making a hollow flexible conductor comprising a die member having a circular opening, a circular plug within the opening, a tapered member at the entrance to said opening having a plurality of laterally inclined guide grooves for segmental wires strands arranged to guide them into the opening in edge to edge relation to form a conductor, and means for drawing the conductor from the die.

18. A machine for making a hollow flexible conductor comprising a die having a tapered member provided with guide grooves for a plurality of segmental strands, said grooves being inclined laterally in a direction circumferentially of the die and arranged to locate the strands in edge to edge relation in a layer in a conductor, means supplying strands to the grooves, and means for drawing the conductor from the die.

19. A machine for making a hollow flexible conductor comprising a die member having a circular opening, a circular plug within the opening, a tapered member at the entrance to said opening having a plurality of laterally inclined grooves for segmental wire strands arranged to guide them into the opening in a layer in edge to edge relation to form a conductor, means to bend the individual strand into a spiral of substantially the shape it has in the conductor before it enters its guide groove, and means for drawing the conductor from the die.

20. A machine for making a hollow flexible conductor comprising a die member having a circular opening, a circular plug within the opening, a tapered member at the entrance to said opening having a plurality of guide grooves for segmental wire strands, said grooves being inclined in a direction circumferentially of the die and arranged to guide the strands into the opening in a layer in edge to edge arrangement to form a conductor, and means for drawing the conductor from the die and at the same time turning it about its axis.

21. A machine for making a hollow flexible conductor comprising a die for arranging a plurality of segmental wire strands in a layer in edge to edge relation in a conductor, a plurality of sets of guides forwardly of the die and spaced longitudinally from each other, each set including a substantially ball shaped member having a guide opening for a strand and mounted for substantially universal rocking movement, and means for drawing the conductor from the die.

22. A machine for making a hollow flexible conductor comprising a die for arranging a plurality of wire strands in a conductor, a plurality of sets of guides forwardly of the die and spaced longitudinally from each other, each set including a substantially ball shaped member having a guide opening for a strand and mounted for substantially universal rocking movement, and means for drawing the conductor from the die.

23. A machine for making a hollow flexible conductor comprising a die including a block having an opening of substantially the external diameter of the conductor and a tapered entrance to said opening, a plug in the center of the opening and having a tapered outer wall at a less inclination than the taper of the entrance opening to provide a space between the walls of the entrance opening and the plug flares outwardly, a guide member at the front of said entrance opening and having guide grooves for a plurality of segmental strands, said grooves being arranged to guide the strands into said flared space in a layer and side by side in the layer, and means for drawing the strands through the die.

24. A machine for making a hollow conductor comprising a die having a tapered opening, a plug in the center of the opening of less taper than the opening, a guide at the entrance to said opening having a plurality of laterally inclined grooves for a plurality of segmental strands, said grooves being arranged to guide the strands into the space between the die and the plug in a layer and side by side in the layer, and means for drawing the strand through the die.

WILLIAM LOWE.